United States Patent [19]

Jelbring

[11] Patent Number: 4,690,205

[45] Date of Patent: Sep. 1, 1987

[54] ARRANGEMENT FOR ENSURING THAT ICE WILL FORM SUBSTANTIALLY UNIFORMLY ON A TUBULAR HEAT EXCHANGER PLACED IN WATER

[76] Inventor: Hans Jelbring, Fridhem 1, S-179 00 Stenhamra, Sweden

[21] Appl. No.: 723,962

[22] PCT Filed: Aug. 13, 1984

[86] PCT No.: PCT/SE84/00275

§ 371 Date: Apr. 12, 1985

§ 102(e) Date: Apr. 12, 1985

[87] PCT Pub. No.: WO85/00878

PCT Pub. Date: Feb. 28, 1985

[30] Foreign Application Priority Data

Aug. 12, 1983 [SE] Sweden .............................. 8304381

[51] Int. Cl.[4] .............................................. F25C 1/12
[52] U.S. Cl. ...................................... 165/45; 62/238.7; 62/260
[58] Field of Search ................ 62/59, 344, 238.7, 260; 165/45; 405/159, 172

[56] References Cited

U.S. PATENT DOCUMENTS

| 672,555 | 4/1901 | Hill ..................................... 165/163 |
| 4,338,043 | 7/1982 | Biancale et al. ..................... 405/172 |
| 4,407,351 | 10/1983 | Backlund ............................. 165/45 |
| 4,540,041 | 9/1985 | Backlund ............................. 165/45 |

FOREIGN PATENT DOCUMENTS 426342 12/1982 Sweden .

Primary Examiner—Albert W. Davis, Jr.
Assistant Examiner—Richard R. Cole
Attorney, Agent, or Firm—Fleit, Jacobson, Cohn & Price

[57] ABSTRACT

A tubular heat exchanger submerged to the bottom of a body of water comprises at least one tubular member through which there is intended to flow a liquid heat carrier whose inlet temperature is lower than the freezing point of the water in the body of water. The tubular member contacts the bottom of a plurality of locations so chosen that the distance between two mutually adjacent locations is short in relation to the length of tube between two consecutive contact locations between the tubular member and the bottom. Those parts of the tubular member which are in contact with the bottom of the body of water are covered with a suitably coherent layer of lump ballast material, which due to the relatively low input temperature of the heat carrier flowing through the tubular member is caused to freeze into a block of ice and ballast material. The frozen block forms a thermal conductor for distributing cold from the inlet of the tubular member and regions in the near vicinity thereof to remaining parts of the tubular member, so that there is formed on the outer surfaces of those parts of the tubular member lying freely in the water between the contact location a cylindrical covering of ice of substantially uniform thickness.

5 Claims, 2 Drawing Figures

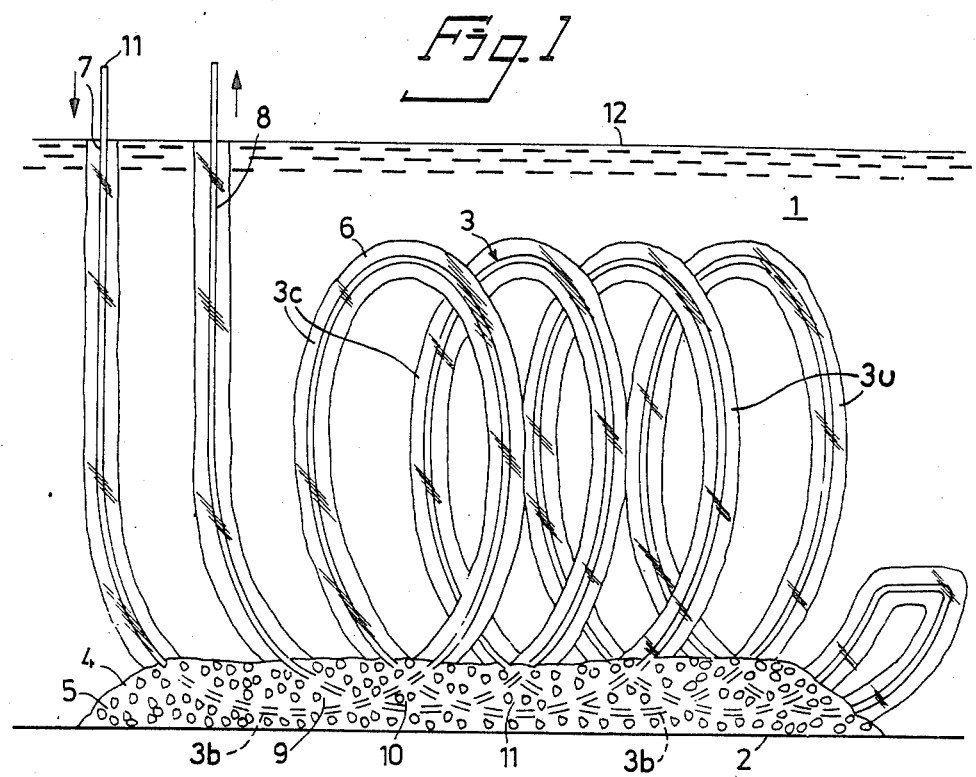
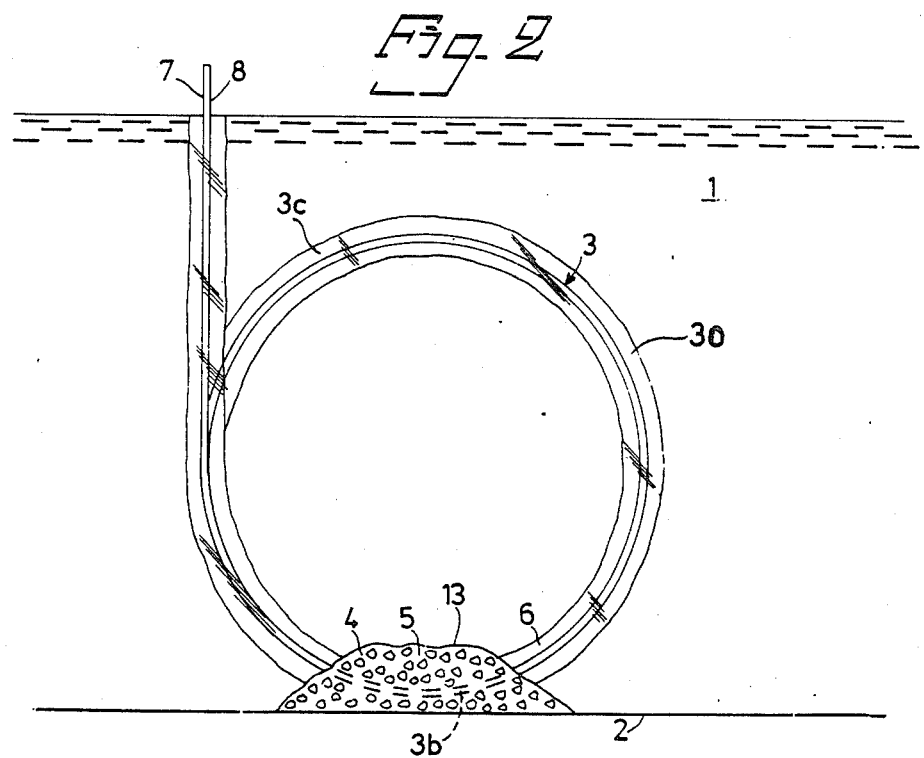

ARRANGEMENT FOR ENSURING THAT ICE WILL FORM SUBSTANTIALLY UNIFORMLY ON A TUBULAR HEAT EXCHANGER PLACED IN WATER

The present invention relates to an arrangement for ensuring that ice will form substantially uniformly on the outer surface of a tubular heat exchanger which is submerged to the bottom of a body of water and which includes at least one tubular member within which there flows a liquid heat carrier whose inlet temperature is lower than the freezing point of the water in said body of water. The invention can be applied in conjunction with heat-pump systems of the kind which take energy from an energy-absorbing closed loop which lies partially in water and through which there is circulated a liquid whose freezing point is lower than that of the water in which the loop is placed. That part of the loop which lies in water will hereinafter be referred to as the heat exchanger while the liquid passing through the loop will be called the heat carrier. The heat exchanger may comprise any number of tubular members connected in parallel.

Thus, the heat pump takes energy from the heat carrier, therewith lowering the temperature thereof, whereafter the temperature of the heat carrier is raised again in the heat exchanger, by taking energy from the water in which the heat exchanger is placed. The invention can be applied when the temperature of the water is so low that part of the energy taken from the water occurs through formation of ice on the outer surfaces of the heat exchanger. This naturally implies that the temperature of the heat carrier is below the freezing point of the water.

A few years ago, the formation of ice on the heat exchanger was considered a disadvantage and should be avoided, since structural damages had occurred as a result thereof. Often, the heat exchanger, either in part or as a whole, rose to the surface of the water, which normally resulted in leakage of heat carrier. In recent times it has been observed that important advantages can be obtained in respect of energy-producing heat-pump systems when ice is permitted to form on the heat exchanger. The energy production plant is always able to take energy from the water, even though the temperature thereof lies close to its freezing point. The plant is normally able to run at full capacity, irrespective of whether the temperature of the water falls to its freezing point during certain periods of operation. The problem encountered when permitting ice to form is that it is often necessary to secure the heat exchanger against the buoyancy forces imparted thereto by the ice, which forces can be quite large. Maximum ice-diameters can reach to between 40 and 70 cms, implying a buoyancy force of about 11-33 kg per meter of heat exchanger tubing of conventional sizes. The problem is not lessened by the fact that the extent to which ice forms varies along the heat exchanger tubing, owing to the fact that the temperature of the heat carrier increases progressively therealong. The result is an ice formation of conical configuration, which may have a diameter of say 50 cm at the beginning of the heat exchanger, and may terminate at a distance of 200 m therefrom. Uneven icing is disadvantageous from the aspect of anchoring down the heat exchanger and also from the point of view of capacity in terms of heat transfer, and also in terms of the ability to accumulate a large quantity of ice.

Several methods of creating substantially uniform icing of heat exchangers immersed in water are known to the art. For example, the direction of flow of the heat carrier can be reversed periodically. Although icing is then relatively uniform, the ice is thickest at the beginning and at the end of the heat exchanger, if the heat carrier is allowed to move in both directions for the same length of time. Icing will be relatively uniform when heat is taken from the heat carrier intermittently while constantly circulating the same, provided that the heat pump is working for less than about 65% of the time. When the pump is switched off, cold will be transmitted from the initial parts of the heat exchanger to its remaining parts, resulting in almost uniform icing. In a third method, a tube-part for outgoing heat carrier is brought into contact with the tube part for incoming heat carrier. This contact can be made along the whole of the tube-parts or at given locations therealong. The tube-parts are thus caused to freeze together and an ice-cylinder is formed around the two tube-parts, which contributes towards uniform icing.

All of the aforedescribed methods for producing uniform icing are encumbered with disadvantages. None of the methods facilitates anchoring of the ice-coated heat exchanger. The method in which the heat-carrier flow is reversed requires the provision of automatic devices and automatically controlled valves, which costs money and reduces reliability. In the method in which the heat pump is run intermittently, the heat exchanger is not used to the whole of its capacity, which means that a larger heat exchanger must be used in order to obtain a certain given capacity. The third method requires the tube-parts forming the heat-exchanger loop to be placed closely together over a significant part of their lengths. This lowers the capacity of the heat exchanger, since when iced-up the double-laid tube will have substantially the same heat transfer capacity per meter as a single ice-covered tube. Consequently, a larger heat exchanger is required to maintain the capacity desired.

The present invention, which is characterized by the features set forth in the claims, ensures substantially uniform icing irrespective of the length of the heat-exchanger tube or the parallel-coupled heat exchanger tubes, by providing a cold bridge between a selected number of locations on each heat-exchanger tube. The cold bridge is produced by arranging the heat-exchanger tube so that it contacts the bottom of the body of water at any number of locations, which are spaced at any distance apart, normally 10–100 cms. The tube, or tubes, is or are then covered at these locations with a layer of shingle or stone of suitable size, or with some other lump ballast material, to a height which is normally preferably equal to the distance between two mutually adjacent contacting locations of the tube-parts with the bottom of the body of water volume.

At low water temperatures and low heat-carrier temperatures, ice will first form around those tube-parts which are covered with shingle or stone, owing to the fact that at these locations the intrinsic convective power transfer is far smaller than with a tube located freely in water. When the distance between the locations at which the tube-parts contact said bottom and the height of the shingle or stone layer are appropriately selected, a cold bridge will develop in the shingle or stone before any appreciable icing occurs on those parts of the heat exchanger located freely in water. This enables ice to form uniformly over the whole length of the heat-exchanger tubing located freely in water.

The invention will now be described with reference to an exemplifying embodiment thereof illustrated in the accompanying drawing, in which FIG. 1 is a schematic side view of an arrangement according to the invention; and FIG. 2 is an end view of the arrangement illustrated in FIG. 1.

A heat-exchanger tube 3 is immersed in a body 1 of water having a top defining surface 12 and a bottom 2. The heat exchanger as a whole can comprise any selected number of heat-exchanger tube members 3 connected in parallel. The heat-exchanger tube 3 is laid in a closed loop in the form of coils 3c within which there circulates a heat carrier 11. The temperature of the heat carrier 11 in the initial, vertically disposed underwater inlet part 7 of the heat exchanger tube 3 is lower than the freezing point of the water. The cold heat carrier 11 is conducted in the heat-exchanger tube 3 down to a pile 4 of shingle or gravel, wherewith ice 5 is formed between the individual stones forming said pile 4. The ice first forms around the vertically disposed inlet or incoming tube-part 7, at its location beneath the pile 4 of shingle, and is then gradually formed around the vertically disposed outlet or outgoing tube-part 8, and its location within said pile 4. The ice 5 has finally frozen practically the whole of the pile 4 of shingle, to form a coherent frozen block. When the pile 4 of shingle freezes, pronounced cold bridges form between bottom-contacting parts 3b of the heat-exchanger tube 3 located in the frozen pile 4 of shingle. For example, cold is transferred from the ingoing tube-part 7 to the outgoing tube-part 8 by the transfer of cold from the locations 9 and 11 to the location 10 on the heat exchanger tube 3. The continued supply of cold heat carrier 11 will result in an even cylindrical formation of ice along the whole of parts 3u of the tubing 3 extending upward from the bottom-contacting parts 3b and located freely in the water 1. The transfer of heat from the water 1 to the heat carrier 11 is lower for the parts 3b of the heat exchanger 3 located in the pile 4 of shingle than for the parts 3u located freely in the water. By and large, this is compensated for, however, when the pile 4 of shingle freezes and a large quantity of heat is taken from the ice surface 13 on the pile 4. The quantities in which shingle is placed over the heat-exchanger tube 3 can be adjusted to prevent the heat-exchanger tube 3 from rising in the water as a result of the buoyancy developed by the ice 6.

What is claimed is:

1. An arrangement for ensuring that ice will form substantially uniformly on the outer surface of a tubular heat exchanger which is submersed to the bottom of a body of water and which comprises at least one tubular member, within which there flows a liquid heat carrier whose inlet temperature is lower than the freezing point of the water in said body of water, wherein the tubular member is so arranged that parts thereof contact said bottom at a plurality of locations so chosen that the distance between two mutually adjacent locations is short in relation to the length of tube between two consecutive contact locations between the tubular member and said bottom, and wherein parts of the tubular member located between said locations lie freely placed in said body of water, at least the majority of said parts in contact with the bottom of said body of water being covered with a suitably coherent layer of lump ballast material, which, due to the relatively low input temperature of the heat carrier flowing through said tubular member is caused to freeze to form a block of ice and ballast material, said frozen block therewith forming a heat conductor for distributing cold from the inlet of the tubular member and the areas adjacent thereto to remaining regions of said tubular member, so that there is formed an ice-coating of substantially uniform thickness on those parts of the tubular member which lie freely placed in said body of water between said locations.

2. An arrangement according to claim 1, wherein the amount of ballast material is sufficient to anchor the tubular member to the bottom of said body of water, in addition to ensuring that ice will form substantially uniformly on the outer surface of said tubular member.

3. An arrangement according to claim 1, wherein the tubular member comprises inlet and outlet end portions, and a series of alternating ones of the bottom-contacting tubular parts and the tubular parts which lie freely placed in the body of water, with the freely placed tubular parts extending upward from the bottom-contacting parts.

4. An arrangement according to claim 3, wherein the bottom-contacting tubular parts and the freely placed tubular parts form a series of tubular coils.

5. An arrangement according to claim 4, wherein the inlet and outlet end portions of the tubular member are vertically disposed.

* * * * *